April 16, 1957. G. H. SNYDER 2,788,897
SEED SEPARATING MACHINES
Filed June 8, 1955 3 Sheets-Sheet 1
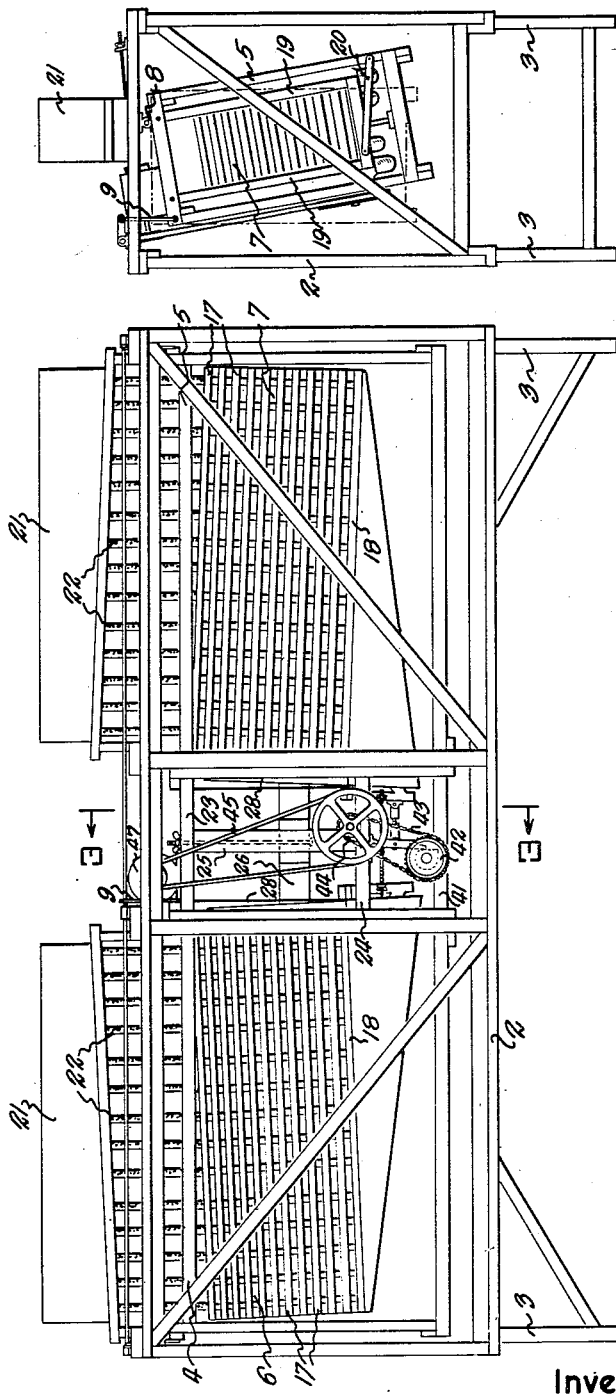
Inventor
GEORGE H. SNYDER,
By~Fetherstonhaugh & Co.
Att'ys April 16, 1957  G. H. SNYDER  2,788,897
SEED SEPARATING MACHINES
Filed June 8, 1955  3 Sheets-Sheet 2

Inventor
GEORGE H. SNYDER
By~Fetherstonhaugh&Co.
Att'ys

April 16, 1957   G. H. SNYDER   2,788,897
SEED SEPARATING MACHINES
Filed June 8, 1955   3 Sheets-Sheet 3

Inventor
GEORGE H. SNYDER
By ~ Fetherstonhaugh & Co.
Att'ys

United States Patent Office 2,788,897
Patented Apr. 16, 1957

2,788,897

SEED SEPARATING MACHINES

George H. Snyder, Waterdown, Ontario, Canada

Application June 8, 1955, Serial No. 514,073

11 Claims. (Cl. 209—112)

This invention relates to improvements in machines for separating weed seeds from crop seeds, and the primary object of the invention is to improve the type of machine shown in United States Patent No. 1,686,374, issued October 2, 1928.

The machine as disclosed in said patent comprises a horizontally reciprocating carrier containing a series of flat seed separating plates and upon which the seeds move to separate under the reciprocating motion of the plates; such motion being imparted to the carrier by a rotated snail cam which moves the carrier relatively slowly in one direction and permits it to substantially snap back under spring tension in the opposite direction.

While this machine proved itself to be relatively efficient it had one quite objectionable feature in that if the machine was not rigidly anchored in place it would continually creep under the influence of the snapping reciprocation of the seed plate carrier, and through creeping lose the delicately adjusted action necessary for efficient seed separation.

To overcome this deficiency it has been general practice to position the machine to abut a strong wall or column of the building in which the machine is housed whereby the abutment receives the impact shock of the reciprocating movement and retains the machine against creeping. This practice is obviously objectionable as it imparts fast reoccurring shocks to the building.

The object of this invention is to overcome the foregoing deficiency by providing a twin opposed machine consisting of two carriers reciprocated in opposition to each other whereby the reciprocal movement of one carrier is counterbalanced by the synchronous reciprocal movement of the other carrier in the opposite direction.

A further object of the invention is to position a buffer block between and in line with the reciprocating paths of the two carriers and against the opposite faces of which the carriers come to rest at the critical seed separating points of their travel; the block being vertically adjustable and the paths of reciprocation of the carriers inclined downwardly in relation to the path of movement of the block whereby the lengths of the strokes of the carriers are relative to the position of the block.

Another object of the invention is to simultaneously and oppositely reciprocate the carriers by means of a rotated snail cam acting against the tension of a spring tending to pull the carriers towards each other.

A very important objective of the whole invention is to provide convenient easily manipulated controls for setting the employed working forces, gravity and inertia, into the correct relation to one another with regard to the various rolling and weight characteristics of the different classes of seeds to be separated; the successful operation of any machine of this class being very critically dependent upon a meticuously correct motion of the seed separating elements in order to produce the exact impulse required to effect accurate seed separation of the small quantity of generally minute seeds delivered on each impulse to the seed separating plates.

To the accomplishment of the above and subordinate objects presently appearing, a preferred embodiment of my invention has been illustrated in the accompanying drawings, set forth in detail in the following description, and defined in the claims appended thereto.

In the said drawings:

Fig. 1 is a side elevational view of the machine.

Fig. 2 is an end view of the machine.

Figure 3:
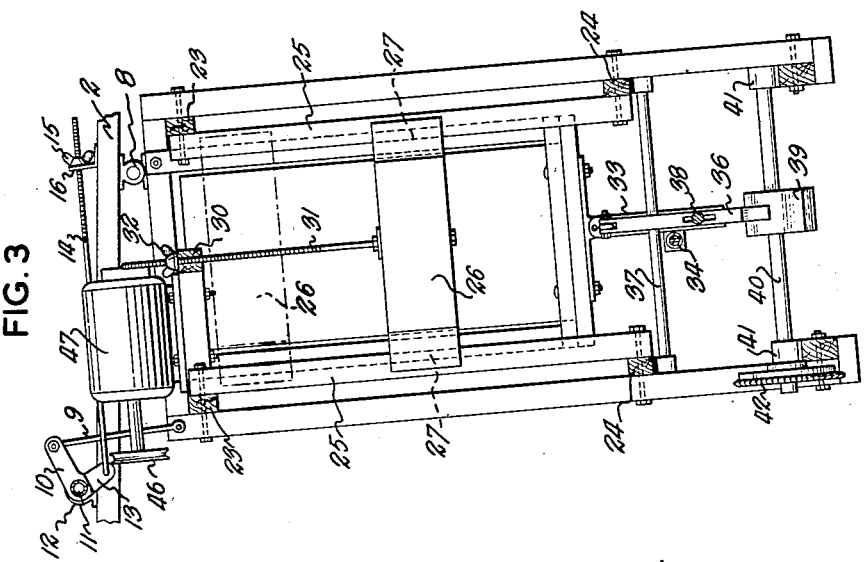
Fig. 3 is an enlarged cross-sectional view taken substantially through the line 3—3, Fig. 1, and showing the buffer block and part of the reciprocating drive mechanism.

The two reciprocating seed separating carriers and the actuating and buffer mechanism positioned therebetween are carried within a stationary box-like frame 2 mounted upon suitable corner legs 3. This frame in turn contains a pair of box-like tiltable cradle frames 4 and 5 formed as a unit and within which the carrier plate assemblies 6 and 7 are swingably mounted. The cradle frames are tiltably suspended on pivots 8 carried in alignment by the top of the frame 2 and are attached to one side of the tops of the cradle frames, as shown in Figs. 2 and 3. As also shown in these figures, the other sides of the tops of the cradle frames are supported by the lower ends of rods 9 hanging from arms 10 carried by a shaft 11 mounted within bearings 12 and extending from end to end of the frame 2. The cradle frames are normally suspended at an inclination, and to retain the frames at the desired inclination the shaft 11 is adjustably held against turning by attaching an arm 13 on the shaft to the end of a threaded rod 14 extending across the top of the frame 2 and carrying a wing nut 15 abutting a rod bearing bracket 16 whereby adjustment of the nut upon the rod will turn the shaft 11 to alter the inclination of the cradle frames.

The carrier assemblies constitute banks of seed separating plates 17 mounted upon two base members 18, the four corners of each base member being attached to the lower ends of four flexible strips 19 attached at their upper ends to the tops of the cradle frames and whereby the plate banks are swingably capable of reciprocable movement within the cradle frames. To retain the plate banks in their correct inclined position within the inclined cradle frames flexible strips 20 are positioned to extend from the upper tilted sides of the cradle frames to the plate banks, as illustrated in Fig. 2.

Figure 4:
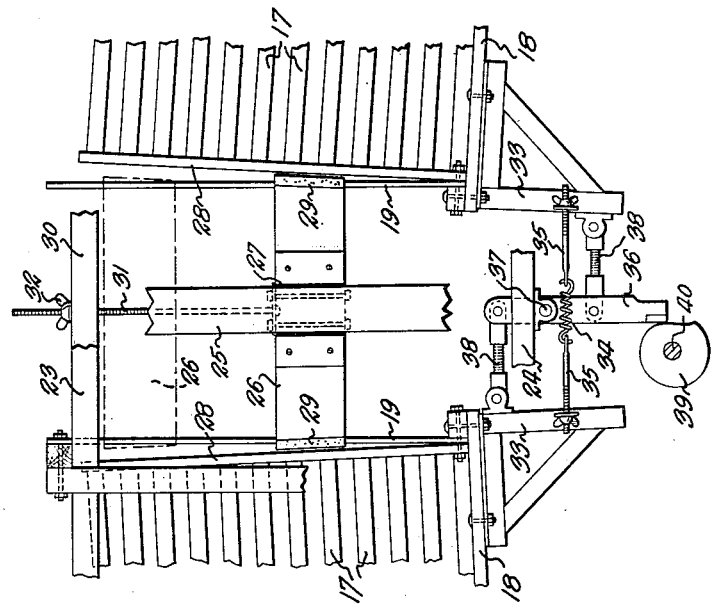
Fig. 4 is a front elevational view of the assembly of parts shown in Fig. 3.

Seeds for separation are fed from hoppers 21 through flexible tubes 22 to the upper faces of the inclined plates of the banks and whereby the reciprocating motion of the banks imparts a skidding momentum to the weed seeds in one direction and a rolling motion to the crop seeds in another direction upon the plates. As will be clearly seen upon reference to Fig. 4 the banks of plates as well as being tilted with their supporting tilted cradle frames are also inclined upwardly towards the central operating mechanism portion of the machine, which arrangement is useable in controlling the length of reciprocating travel of the banks, as shall now be described.

Two pairs of upper and lower cross braces 23 and 24 extend between the ends of the cradle frames 4 and 5 and support a pair of vertical guide bars 25 on either side of the operating mechanism and between which a buffer block 26 is slidably mounted, the guide bars being contained within groove arrangements 27 in the sides of the buffer. The faces of the buffer against which the ends 28 of the carrier plate banks impact are faced with resilient impact jar reducing material 29. A central brace 30 also extends between the cradle frames and carries a depending threaded rod 31 and to the lower end of which the buffer block is attached. The rod carries a wing nut 32 resting upon the top of the brace 23, and whereby turning of the nut raises or lowers the buffer; it being apparent from Fig. 4 that the raising of the buffer block from a lower position, such as shown in full lines, to an upper position such as shown in dotted lines, will permit the carrier banks to have a greater reciprocation before impacting the block.

The bottoms of the carrier bank ends 28 carry brackets 33 which are drawn towards each other by a spiral spring 34 extending between the ends of a pair of tension adjusting bolts 35 extending from the brackets. The reciprocating mechanism acting against the resilient tension of the spring 34 comprises a vertical cam actuated rocker arm 36 centrally positioned between the brackets 33 and swingably carried upon a transverse rod 37 attached to and extending between the pair of braces 24. The rocker arm is connected to the two brackets 33 by a pair of upper and lower links 38 which are in the form of turn buckles to permit adjustment of the distances between the banks and the rocker arms.

The rocker arm is actuated by a cam 39 secured to a shaft 40 journalled upon and extending between a pair of lower braces 41 extending between the lower corners of the cradle frames 4 and 5. The shaft 40 carries a sprocket 42 connected by a chain 43 to a pulley and sprocket combination 44 mounted on the front brace 24 and which is in turn connected by a belt 45 to the pulley 46 of an electric motor 47 carried by the top braces 23. Actuation of the motor rotates the cam 39 in a clockwise direction to produce oscillating movement of the rocker arm 36, as illustrated in Figs. 5 to 9.

The basic principle of seed separation in this type of machine consists of utilizing the reciprocating movements of the banks of plates to impart a skidding motion to weed seeds, which is possible as most varieties are less symmetrical than cultivated seeds, and at the same time to impart a rolling motion to the symmetrical cultivated seeds thereby imparting a divergent direction of travel to each class of seed. It will therefore be apparent that the pattern of motion imparted to the plates by the cam 39 is highly critical in attaining thorough separation.

Figure 5:
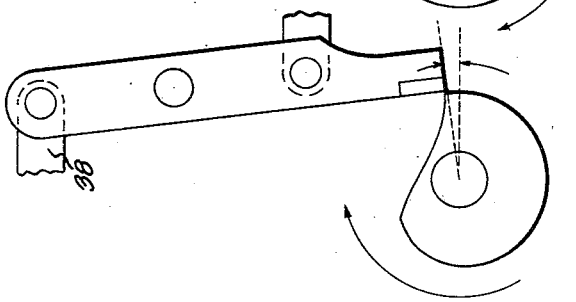

Fig. 5 shows the cam 39 in position wherein the face of the cam is about to pass out of contact with or trip the rocker arm, assuming this phase as the inception of the cycle of motion wherein the plate banks are in their outermost positions of travel under the maximum movement of swing of the rocker arm against the tension of the spring 34. Upon the rocker arm being tripped the plate banks immediately move towards each other under the pull of the spring 34 to impact the resilient faces 29 of the buffer block 26. As the banks of plates, each plate carrying a supply of seed, begin their movement towards the buffer block they accelerate in momentum as their inertia is overcome by the stress of the spring until contact is made with the resilient faces of the buffer block. In this phase of the cycle of motion the resilient block faces absorb the impact energy of the banks to rebound them from the block. Under this movement the seeds on the plates will either skid or roll, depending upon their shape, to effect separation.

Figure 7:
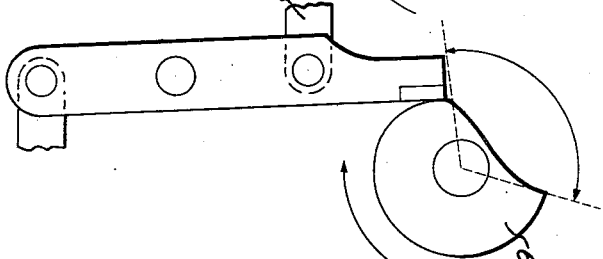
Figure 6:
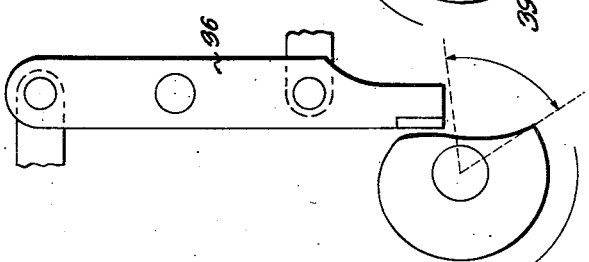

During the time lapse from moment of impact between the plate banks and buffer block to the end of the rebound period, the cam 39 rotates to the position shown in Fig. 6, and wherein the rocker arm is at the full extremity of its swing and out of contact with the cam before rebounding to the position shown in Fig. 7 and during which instant the cam has rotated to the position shown in this figure. The cam is so arranged that it makes smooth engaging contact with the rocker arm just before the rebound motion is spent and while the rocker arm is still moving away from the cam. This requirement is met by shaping the cam with a rise in its periphery slightly greater than the distance traversed by the follower of the rocker arm whereby contact between the cam and the rocker arm will be in a smooth overriding motion and not by shock producing collision, and as shown in Fig. 7.

Figure 9:
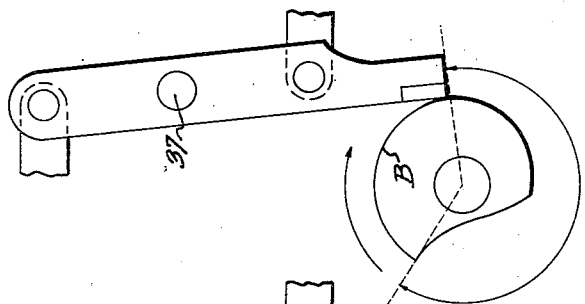
Figs. 5 to 9 are schematic views of the several phases of the revolution of the cam which provides the simultaneous reciprocating motions of the seed separating carriers.
Figure 8:
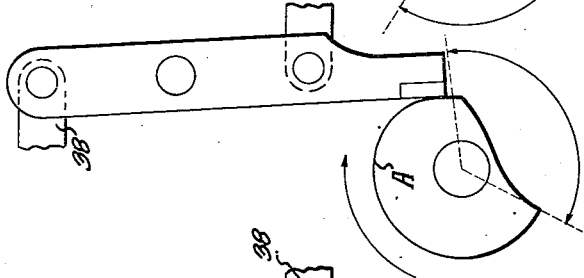

Fig. 8 shows the rocker arm riding on the face portion A of the cam which is a rising eccentric and which continues to move the carriers in the same direction as the spent rebound until the concentric cam face portion B has been reached, as shown in Fig. 9 and at which point the rocker arm ceases its swing. During this rest period the seeds on the plates settle down. Without this seed settling period there would be a tendency for the plates to ride from under the seeds when the direction of motion is reversed.

From the foregoing description it will be seen that by my arrangement in opposing the movements of the two plate carriers I have devised a seed separating machine wherein the impact forces of the reciprocated carriers are in counterbalancing opposition which obviates the necessity of abutting the machine against a solid object; it being also apparent that a reciprocated counterbalancing mass could be used in place of a second carrier, the vertically adjustable buffer block providing a simple means for adjusting the distance of travel of the plate banks. It is also understood that I do not necessarily confine my invention to the construction as disclosed, but that any desired changes may be made without departing from the spirit of my invention as set out in the appended claims.

What I claim as my invention is:

1. A seed separating machine comprising a reciprocal carrier containing a series of seed separating inclined plates arranged in vertically spaced parallel relationship and surfaced to provide seed rolling inclines and a reciprocal counterbalancing mass oppositely positioned to the carrier, and reciprocating means for simultaneously moving the carrier and mass apart and part way towards one another in their reciprocating movements and a spring under the tension of which the carrier and mass complete their movement towards one another.

2. A seed separating machine comprising two reciprocal carriers oppositely positioned to one another and each having a series of seed separating inclined plates carried therein and arranged in vertical spaced parallel relationship and surfaced to provide seed rolling inclines, and carrier reciprocating means for simultaneously moving the carriers apart and towards one another in their reciprocating movements.

3. A seed separating machine as defined in claim 2, wherein the carrier reciprocating means comprises a rocker arm centrally pivoted and with its end portions connected to the carriers, a spring drawing the carriers towards each other in opposition to swinging movement of the rocker arm in one direction, and a rotated cam rocking the rocker arm.

4. A seed separating machine as defined in claim 2, wherein the carrier reciprocating means is positioned between the two carriers and comprises a rocker arm centrally pivoted and with its end portions connected to the carriers, a spring drawing the carriers towards each other in opposition to swinging movement of the rocker arm in one direction, a rotated cam rocking the rocking arm, and a buffer block positioned between the two carriers and with which they impact in their spring drawn movements towards each other.

5. A seed separating machine as defined in claim 2, wherein the opposed ends of the carriers are inclined upwardly and divergently from one another, and a buffer block positioned between the opposed carrier ends and with which they impact in their movements towards one another, and means for moving the buffer block in a vertical path to which the carrier ends are divergent for adjustment of the length of the carrier's inward travel to impact the block.

6. A seed separating machine as defined in claim 2, wherein the opposed ends of the carriers are inclined upwardly and divergently from one another, a buffer block positioned between the opposed carrier ends and with which they impact in their movements towards one another, means for moving the buffer block in a vertical path to which the carrier ends are divergent for adjustment of the length of the carrier's inward travel to impact the block, the carrier reciprocating means being also positioned between the two carriers and comprising a rocker arm centrally pivoted with its end portions connected to the carriers, a spring drawing the carriers towards the block in opposition to the swinging movement of the rocker arm in one direction, and a rotated cam rocking the rocker arm.

7. A seed separating machine as defined in claim 2, wherein the carrier reciprocating means is positioned between the two carriers and comprises a rocker arm centrally pivoted and with its end portions connected to the carriers, a spring drawing the carriers towards each other in opposition to swinging movement of the rocker arm in one direction, a rotated cam rocking the rocking arm, a buffer block positioned between the two carriers and with which they impact in their spring drawn movements towards each other, and resilient impact receiving faces on the buffer block and from which the carriers rebound upon impact therewith, the cam being set to rotate into smooth engaging contact with the arm before the rebound motion of the carriers is spent.

8. A seed separating machine as defined in claim 2, wherein the opposed ends of the carriers are inclined upwardly and divergently from one another, a buffer block positioned between the opposed carrier ends and with which they impact in their movements toward one another, resilient impact receiving faces on the buffer block and from which the carriers rebound upon impact therewith, and wherein the carrier reciprocating means comprises a rocker arm centrally pivoted and with its end portions connected to the carriers, a spring drawing the carriers towards the buffer block in opposition to swinging movement of the rocker arm in one direction, and a rotated cam rocking the rocker arm, the cam being set to move out of contact with and release the arm to swing under the tension of the spring drawing the carriers together and to rotate into smooth engaging contact with the arm before the rebound motion of the carriers is spent.

9. A seed separating machine as defined in claim 2, wherein the carriers are tiltable transversely of the paths of their reciprocating movements, and comprising a frame from which the carriers are hung, pivots on the frame supporting the carriers at one side, and a manually rotatable shaft carried by the frame and positioned above the other side of the carriers, arms protruding from the shaft, and links extending from the arms to said other side of the carriers.

10. A seed separating machine as defined in claim 2, wherein the carrier reciprocating means is positioned between the two carriers and comprises a mechanism for moving the carriers fully apart and also for moving the carriers part way towards one another, and a spring under the tension of which the carriers complete their movements towards one another upon their release from engagement with the reciprocating mechanism.

11. A seed separating machine as defined in claim 3, wherein a buffer block is positioned between the two carriers and with which they impact in their spring urged movement towards one another.

References Cited in the file of this patent

UNITED STATES PATENTS

| | | |
|---|---|---|
| 505,723 | Pollack | Sept. 26, 1893 |
| 1,214,506 | Brasack | Feb. 6, 1917 |
| 1,563,531 | Schieferstein | Dec. 1, 1925 |
| 1,686,374 | Franks | Oct. 2, 1928 |
| 1,728,657 | Binte | Sept. 17, 1929 |
| 2,535,851 | Harrison et al. | Dec. 26, 1950 |
| 2,577,565 | Bradley | Dec. 4, 1951 |